(12) United States Patent
Jornod et al.

(10) Patent No.: US 11,096,064 B2
(45) Date of Patent: Aug. 17, 2021

(54) METHOD FOR PREDICTING A QUALITY OF SERVICE FOR A COMMUNICATION BETWEEN AT LEAST TWO MOVING COMMUNICATION PARTNERS, APPARATUS FOR PERFORMING THE METHOD, TRANSPORTATION VEHICLE, BACKEND SERVER, AND COMPUTER PROGRAM

(71) Applicant: VOLKSWAGEN AKTIENGESELLSCHAFT, Wolfsburg (DE)

(72) Inventors: Guillaume Jornod, Berlin (DE); Ahmad El Assaad, Wolfsburg (DE)

(73) Assignee: Volkswagen Aktiengesellschaft

( * ) Notice: Subject to any disclaimer, the term of this patent is extended or adjusted under 35 U.S.C. 154(b) by 112 days.

(21) Appl. No.: 16/556,460

(22) Filed: Aug. 30, 2019

(65) Prior Publication Data
US 2020/0077278 A1   Mar. 5, 2020

(30) Foreign Application Priority Data

Sep. 4, 2018 (EP) .................................... 18192452

(51) Int. Cl.
*H04W 16/22* (2009.01)
*H04W 4/40* (2018.01)
(Continued)

(52) U.S. Cl.
CPC ............. *H04W 16/22* (2013.01); *H04W 4/40* (2018.02); *H04W 24/10* (2013.01);
(Continued)

(58) Field of Classification Search
CPC combination set(s) only.
See application file for complete search history.

(56) References Cited

U.S. PATENT DOCUMENTS 10,868,733 B2 * 12/2020 Dribinski ........ H04W 36/00837
10,892,929 B2 *  1/2021 Sorrentino ........... H04B 7/0891
(Continued)

FOREIGN PATENT DOCUMENTS

| DE | 102012103694 A1 | 10/2013 |
| DE | 112013002803 T5 | 3/2015 |

(Continued)

OTHER PUBLICATIONS

Kilnic et al., 5G Multi-RAT Integration Evaluations Using a Common PDCP Layer (Abstract); IEEE 85th Vehicular Technology Conference (VTC Spring); Jun. 4-7, 2017; Sydney, Australia.
(Continued)

*Primary Examiner* — Xavier S Wong
(74) *Attorney, Agent, or Firm* — Barnes & Thornburg LLP

(57) ABSTRACT

A method for predicting a quality of service for a communication between at least two moving communication partners, wherein the prediction is based on at least one link-based quality of service map that is updated in a link-based QoS map generation process. Since classical radio maps are node-based, the classical radio maps are not appropriate for estimating an end-to-end latency for the communication link. The end-to-end latency is needed when determining whether safety critical messages are to be exchanged over this communication link.

31 Claims, 6 Drawing Sheets

(51) Int. Cl.
*H04W 28/02* (2009.01)
*H04W 28/04* (2009.01)
*H04W 24/10* (2009.01)
*H04W 24/02* (2009.01)

(52) U.S. Cl.
CPC ....... *H04W 28/0268* (2013.01); *H04W 28/04* (2013.01); *H04W 24/02* (2013.01)

(56) References Cited

U.S. PATENT DOCUMENTS

| | | | |
|---|---|---|---|
| 2013/0122819 | A1 | 5/2013 | Vuyyuru et al. |
| 2014/0213241 | A1 | 7/2014 | Altintas et al. |
| 2014/0355501 | A1 | 12/2014 | Carmon et al. |
| 2015/0120087 | A1 | 4/2015 | Duan et al. |
| 2015/0334750 | A1* | 11/2015 | Mehta ................... H04W 24/10 370/329 |
| 2018/0338250 | A1* | 11/2018 | Mishra .................. H04W 24/10 |
| 2019/0230485 | A1* | 7/2019 | Hahn ................ H04W 72/0486 |

FOREIGN PATENT DOCUMENTS

| | | |
|---|---|---|
| DE | 102015225388 A1 | 6/2017 |
| DE | 102017114049 A1 | 1/2018 |
| DE | 102017009510 A1 | 3/2018 |
| EP | 2487506 A1 | 8/2012 |
| JP | 2017022503 A | 1/2017 |
| WO | 2018095550 A1 | 5/2018 |

OTHER PUBLICATIONS

European Patent Application No. 18184352.5; Jul. 19, 2018.
European Patent Application No. 18192353.3; Sep. 4, 2018.
European Patent Application No. 18192367.3; Sep. 4, 2018.

* cited by examiner

METHOD FOR PREDICTING A QUALITY OF SERVICE FOR A COMMUNICATION BETWEEN AT LEAST TWO MOVING COMMUNICATION PARTNERS, APPARATUS FOR PERFORMING THE METHOD, TRANSPORTATION VEHICLE, BACKEND SERVER, AND COMPUTER PROGRAM

PRIORITY CLAIM

This patent application claims priority to European Patent Application No. 18192452.3, filed 4 Sep. 2018, the disclosure of which is incorporated herein by reference in its entirety.

SUMMARY

Illustrative embodiments relate to a method for predicting a quality of service for a communication between at least two dynamically moving communication partners. Illustrative embodiments also relate to a corresponding apparatus for performing the method, a transportation vehicle, backend server and a corresponding computer program.

BRIEF DESCRIPTION OF THE DRAWINGS

Exemplary embodiments are shown in the drawings and are explained in greater detail in the following description. In the drawings.

DETAILED DESCRIPTION

Figure 1:
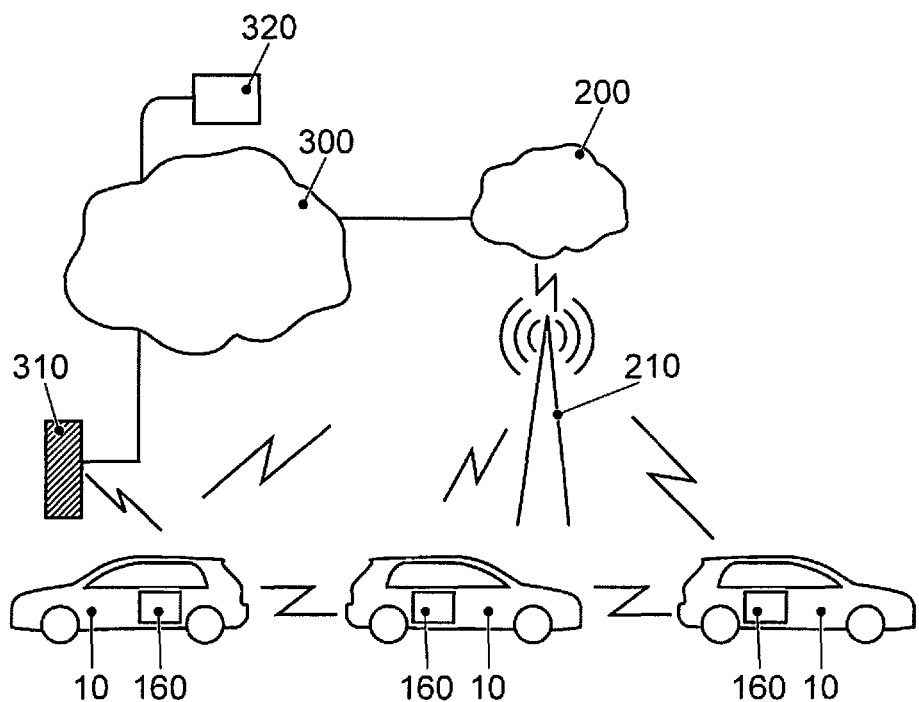
FIG. 1 illustrates the principle architecture of a V2V and V2X communication system.

For the scenario of transportation vehicles equipped with wireless communication modules that provide connectivity to public communication networks but also provide a direct communication capability for exchanging information among the road participants, wireless communication offers the opportunity to implement a wide range of applications. A lot of research concerns the fields of cooperative and autonomous driving. Direct communication between transportation vehicles is often referred to be vehicle-to-vehicle communication V2V. Also possible is communication from and to a transportation vehicle with infrastructure communication stations such as a road side unit RSU. Such type of communication is very often referred to be V2X communication (vehicle-to-everything).

Autonomous driving (sometimes referred to as automatic driving, automated driving or piloted driving) is the movement of transportation vehicles, mobile robots and driverless transport systems which are largely autonomous. There are different degrees of autonomous driving. In this case, autonomous driving is also spoken at certain levels even if a driver is still present in the transportation vehicle, who possibly only takes over the monitoring of the automatic driving operation. In Europe, the various transport ministries (in Germany, the Federal Institute for Road Systems (Bundesanstalt für Straßenwesen) was involved) worked together and defined the following autonomous stages.

Level 0: "Driver only", the driver drives himself, steers, gives gas, brakes, etc.

Level 1: Certain assistance systems help with transportation vehicle operation (including a cruise control system—Automatic Cruise Control ACC).

Level 2: Partial automation. Therein, automatic parking, tracking function, general longitudinal guidance, acceleration, deceleration, etc. are taken over by the assistance systems (including collision avoidance).

Level 3: High automation. The driver does not have to monitor the system continuously. The transportation vehicle independently performs functions such as the triggering of the turn signal, lane change and tracking. The driver can turn to other things, but if requested, the system is requested to take over the lead within a pre-warning period. This form of autonomy is technically feasible on motorways. Legislators are working to allow Level 3 vehicles. The legal framework has already been created.

Level 4: Full automation. The guidance of the transportation vehicle is permanently adopted by the system. If the system is no longer able to handle the tasks, the driver can be asked to take the lead.

Level 5: No driver required. Apart from setting the target and starting the system, no human intervention is required.

A slightly different definition of levels is known from the Society of Automotive Engineers SAE for a pan-European cooperation on this matter. This could also be used instead of the above given definition. Future cooperative driving applications are envisioned to significantly improve efficiency and comfort of automated driving. Increase in cooperation between transportation vehicles pose specific requirements on communication system and the way messages are exchanged among cooperating transportation vehicles.

Typical communication scenarios for V2V communication are road safety scenarios, traffic efficiency scenarios and infotainment scenarios. From the road safety scenarios the following examples are mentioned: "Cooperative Forward Collision Warning", "Pre-Crash-Detection/Warning", "Lane change warning/blind spot warning", "Emergency Electric Brake Light Warning", "Intersection Movement Assist", "Emergency Vehicle Approaching", "Road Works Warning" (non-exhaustive list). From the traffic efficiency scenarios the "High-Density Platooning" is mentioned. The high density platooning application could also be regarded to be an example of the road safety scenarios, because the cooperative driving of a plurality of transportation vehicles in a convoy with small distance (<10 m) is very critical in terms of the safety requirements.

Particularly in the field of high density platooning, the transportation vehicles in the convoy need to exchange a plurality of messages. Typically, the entire convoy is controlled by a transportation vehicle configured as a lead transportation vehicle, it is called platoon leader. For example, a feedback of information about an intended braking maneuver is planned from the front to the rear to avoid rear-end collisions.

Currently the following mobile communication technologies are applicable for bringing connectivity to a transportation vehicle: 3GPP-based UMTS, HSPA, LTE, and the upcoming 5G standards.

For the V2V or V2X communication the following technologies are readily available. LTE-V sidelink communication, also called PC5 interface, 5G PC5 communication, WLAN p communication (IEEE 802.11p).

Autonomous driving is on the rise. Though it has been demonstrated that autonomous transportation vehicles can rely on their own sensors for environmental scanning, it is foreseen that they can greatly benefit from cooperation with surrounding transportation vehicles, either in terms of control or in terms of perception. This cooperation is supported by V2V or in general V2X communication.

Communication standards define performance metrics for communication technologies such as minimums, maximums, averages, etc. of some key performance indicators KPIs. The indicators, such as latency τ of a data communication, throughput Th, data rate DR, packet error rate PER, vary within and around these values, sometimes drastically dropping or increasing. This variation can drastically affect the quality of applications. For safety-related applications, such as some applications of cooperative automated driving, the average achievable latency with best effort policy does not comply with the quality requirements of the automotive industry, for instance. Especially when it comes to V2V and V2X and time critical safety related applications, this potential variation and this absence of guaranty of quality of service seriously QoS affects the potential use of such technologies.

Indeed, the design of a cooperative function will take the worst-case scenario for functional safety reasons. As a result, the performance of the cooperative function will be most likely the one of the individual system thus yielding to a limited benefit of the V2X technology.

A novel concept of adaptation of the application to the quality of service, the so-called Agile Quality of Service Adaptation (AQoSA) is emerging within the automotive industry. However, considering the tight time constraints that are generally characterizing automotive safety-related applications, reacting to the QoS is not sufficient, considering the involved adaptation delays, for instance. This is where the concept of QoS prediction intervenes.

An emerging concept of modern communication systems is the surroundings awareness. Sensing and understanding its environment, a communication system can adapt its functioning to external conditions such as dynamic scatterers (e.g., other transportation vehicles) or static scatterers (e.g., buildings).

The main limitation of such a system is that, due to their dynamics, transportation vehicles have very limited channel estimation data. Moreover, this data becomes very soon obsolete. Transportation vehicles could therefore benefit from historical channel information to better understand future channel conditions.

Another state of the art concept is the design of heterogeneous communication systems, which uses multiple radio access technologies (RAT) to achieve better performance. The performance of multi-RAT systems is highly depending on the QoS prediction on which combination and switching decisions are made.

From DE 10 2012 103 694 A1 a radio station is known, which is capable to communicate in a mobile communication system and performs measurements on the radio signals of the mobile communication system. Based on these measurements the radio station determines the quality of service of the mobile communication system and decides if the transmission of its data is possible.

From DE 10 2017 009 510 A1 a method for updating a digital map in a transportation vehicle is known. The method makes use of a network coverage map being recorded in the transportation vehicle. Then for updating the map, the data rate will be variably determined due to the information in the network coverage map. If the transportation vehicle is approaching an area without network coverage, the amount of map data which is downloaded as long as the transportation vehicle is in the coverage area is controlled such that the transportation vehicle navigation system has enough data available for navigating the transportation vehicle through the area without network coverage.

From DE 10 2017 114 049 A1 a system for determining and executing an autonomous-vehicle travel route is known. The storage medium includes an input-interface module that, when executed by the hardware-based processing unit, obtains factor data indicating factors relevant to determining a transportation vehicle travel route. The storage medium also includes a route-generation module comprising a route-complexity sub-module. The route-complexity sub-module determines, based on the factor data, route-complexity indexes corresponding to respective optional routes. The route-generation module determines the transportation vehicle travel route based on the route-complexity indexes. In some disclosed embodiments, the storage includes an autonomous-driving perceptions module and an autonomous-driving control module for modifying transportation vehicle functions in executing the autonomous-driving travel route.

The document WO 2018/095550 A1 discloses a transmitter communication device for a D2D communication network with a plurality of communication devices, including one or more receiver communication devices and a plurality of relay communication devices.

The document US 2014/355501 A1 discloses systems and methods for sleep mode and staged connectivity in Multi-RAT environments.

In the field of communication prediction, QoS- and radio maps are state of the art tools that enable an adaptation to QoS variations. These maps may be generated by making use of knowledge about the environment as well as knowledge from statistical/historical data. Knowledge about the environment may be some shadowing effect prediction, white spot and static scatterers mapping, and Doppler shift prediction caused by dynamic scatterers like trucks, busses or other transportation vehicles building an obstacle for the direct communication to another transportation vehicle. Historical QoS data can be gathered by managing nodes, such as the base station eNodeB of the LTE mobile communication system, on the effective QoS and be mapped to the environment knowledge.

These methods have two main drawbacks. First, they most likely require a central managing node. If not, they are most likely limited to the historical knowledge of the communication node in its communication range. That is, two communicating partners may have different QoS maps considering their historical experience, which would affect their decisions in distributed cooperative application adaptation (such as modifying the inter-vehicle distance of a platoon depending on the quality of the link) or in multi-RAT decision-making. Second, these maps are node-oriented and not link-oriented. They offer load-, path-loss- or data rate prediction but not link-oriented QoS prediction such as end-to-end (E2E) latency.

What is needed is maintaining an optimized quality of application (QoA). In this regard the problem can be split up in two topics:
predict the future channel variation and the resulting QoS change to adapt the application,
adapt the communication settings to improve the V2X or V2V communication.

Disclosed embodiments provide a method of predicting a quality of service for a communication between at least two moving communication partners, a corresponding apparatus for performing the method, a transportation vehicle, a back-end server and a corresponding computer program.

The present document introduces the idea of the creation of link-based QoS map. It bases its description on an illustrative example, a high density platoon (HDPL), led by a platoon leader, driving on a high way with surrounding traffic, heterogeneous cellular network access, variating scattering and shadowing object presence. These conditions let the QoS of the different RAT drastically vary. This HDPL relies on communications to drive with very short inter-vehicle distances. A drop in the communication performance, in particular, in an end-to-end latency, would affect its safe running. It is however able to adapt its distance based the prediction of the link-based QoS.

In at least one disclosed embodiment the proposal concerns a method for predicting a quality of service for a communication between at least two moving communication partners, wherein the prediction is based on at least one link-based quality of service map, that is updated in a link-based QoS map generation process. Since classical radio maps are node-based, they are not appropriate for estimating an end-to-end latency for the communication link. The end-to-end latency however is needed when it comes to the question if safety critical messages can be exchanged over this communication link.

It is beneficial that the link quality map generation process is performed in a communication management partner of the moving communication partners. This disclosed embodiment is well adapted for the use case of high density platooning where the platoon leader serves as communication management partner. However, if platooning is not involved, any of the two communication partners that performs the link-based QoS map generation process also serves as a communication management partner.

In a further disclosed embodiment a spatio-temporally extended link quality map is created by combining the knowledge of the communication management partner with the knowledge of the link-based QoS maps of at least one other communication partner pair. A single link-based QoS map would provide a rather short term prediction horizon considering the high dynamics of some applications such as high density platooning. This is sufficient for multi-RAT decision-making but not necessarily for an application adaptation. This prediction horizon can be extended by combining more link-based QoS maps from other communication partners.

For combining link-based QoS maps it is beneficial to perform the combination of knowledge about the link-based QoS map between the communication management partner and at least one other communication partner pair by transferring link-based QoS maps to others, e.g., in a broadcast transmission mode and performing an operation of data fusion between at least one entry in the link-based QoS map of the communication management partner (PL) with the corresponding entries in the link-based QoS maps of the at least one other communication partner pair.

The data fusion method is well developed and has the benefit that it delivers an improvement in the accuracy of the link-based QoS map and thus also improves the accuracy of the quality of service prediction for the link. In at least one disclosed embodiment the at least one other communication partner pair is positioned in the surroundings of the communication management partner such that the transfer of the QoS maps can easily be performed with V2V communication.

For the data fusion operation it is beneficial to perform an operation of selecting an area of interest in the communication management partner and to perform the data fusion operation in the area of interest. This helps much to reduce the calculation expenditure for the data fusion operation.

In another disclosed embodiment, the moving communication partners apply a multi-RAT communication technology where a communication partner is equipped with a number of different radio access technologies, each one being used for a corresponding RAT communication link, and wherein the prediction of a quality of service for a communication between at least two of the moving communication partners is performed for at least two of the RAT communication links according to the different radio access technologies. Normally, to benefit fully from the multi-RAT technology, the prediction would be done for all of the available multi-RAT communication links.

Optionally, the link-based QoS map generation process comprises the operations of a link quality data gathering for ongoing communications on the different multi-RAT communication links from other communication partners, an operation of data gathering of the dynamics of the movements of the other communication partners, an operation of creating a path-loss map based on a scene understanding derived from an environment observation of at least one of the other communication partners, an operation of creating a technology utilization map showing the current load of the respective RAT communication link at least in the area of interest, and deriving a link-based QoS map. This way a pretty accurate link-based QoS map can be generated.

For the safety critical cooperative or autonomous driving scenarios it is beneficial that the link-based QoS map includes an information about the end-to-end latency for a data transmission over the communication link.

Concerning the application of multi-RAT technology, it is beneficial that an operation of deciding for the different links of the multi-RAT technology which communication partners from the moving communication partners shall use which link is performed in the communication management partner, wherein the communication management partner performs an operation of informing the moving communication partners about the link-by-link decision from the operation of deciding.

Further it is beneficial that for the operation of combining the knowledge about the link-based QoS map of the communication management partner with the knowledge of the link-based QoS maps of at least one other communication partner pair an operation of mapping the predicted future perceived environment with the environments from the previous environment perception measurements of the at least one other communication partner pair (V1 to V6) is performed and a future channel representation, is selected for which the mapping between the predicted future environment and the environment from the previous environment perception measurements is best.

Finally, in at least one disclosed embodiment the operation of mapping includes an operation of determining the correlation between the predicted future perceived environment and the environment from the previous environment perception measurements of the at least one other communication partner pair (V1 to V6) and applying the correlation degree to select a future channel representation, for which the likelihood between the predicted future environment and the environment from the previous environment perception measurements is maximized. This way, QoS maps are filtered such that only those QoS maps will be combined which provide information about comparable situations.

For a corresponding apparatus for performing operations in the method according to the proposal it is beneficial if the apparatus comprises a processing device which is adapted to perform the operations of the communication management partner in the method. Typically this processing device is a microcontroller, microprocessor or microcomputer.

For safety critical cooperative or autonomous driving applications it is beneficial to equip a transportation vehicle with such apparatus.

Likewise it is beneficial to equip a backend server with such kind of apparatus.

For a corresponding computer program, it is beneficial that it comprises program code, which when run in a processing device performs the operations of the communication management partner in the method according to the proposal.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles, properties, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided by the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a method or mechanism for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited methods or mechanisms are combined and brought together in the manner which the claims call for. It is thus regarded that any method or mechanism that can provide those functionalities are equivalent to those shown herein.

FIG. 1 shows the system architecture for the proposal. Reference number 10 denotes a user device. The depicted user device is exemplified as a transportation vehicle and more in particular, it is a car. In other examples it may be differently exemplified, e.g., a smart phone, a smart watch, a tablet computer, notebook or laptop computer or the like. Shown is a passenger car. If exemplified with a transportation vehicle, it may be any type of a vehicle. Examples of other types of vehicles are: buses, motorcycles, commercial vehicles, in particular, trucks, agricultural machinery, construction machinery, rail vehicles, etc. The use of the disclosed embodiments would be generally in land vehicles, rail vehicles, watercrafts and aircrafts possible. The transportation vehicle 10 is equipped with an on-board connectivity module 160 including corresponding antenna such that the transportation vehicle 10 can participate in any form of a mobile communication service. FIG. 1 illustrates that transportation vehicle 10 may transmit and receive signals to and from a base station 210 of a mobile communication service provider.

Such base station 210 may be an eNodeB base station of an LTE (Long Term Evolution) mobile communication service provider. The base station 210 and the corresponding equipment is part of a mobile communication network with a plurality of network cells where each cell is served by one base station 210. More detailed information concerning the multi-RAT technology which will be applied in the 5G mobile communication system is provided in the paper "5G Multi-RAT integration evaluations using a common PDCP layer" from C. Kilnic, M. Ericson, P. Rugeland, I. Da Silva, A. Zaidi, O. Aydin, V. Venkatasubramanian, M. C. Filippou, M. Mezzavilla, N. Kuruvatti and J. F. Monserrat.

The base station 210 in FIG. 1 is positioned close to a main road on which the transportation vehicle 10 is driving. Of course, other vehicles may also drive on the road. In the terminology of LTE, a mobile terminal corresponds to a user equipment UE, which allows a user to access network services, connecting to the UTRAN or Evolved-UTRAN via the radio interface. Typically, such user equipment corresponds to a smart phone. Of course, mobile terminals are also used in the transportation vehicles 10. The cars 10 are equipped with the on-board connectivity module OCU 160. This OCU corresponds to an LTE communication module with which the transportation vehicle 10 can receive mobile data in downstream direction and can send such data in upstream direction. This OCU 160 is further equipped with multi-RAT technology corresponding to radio access technology. Multi-RAT networks combine several radio access technologies to deliver the service to users (e.g., UMTS, LTE, Wi-Fi). For the application in transportation vehicles and for the implementation of V2V and V2X communication capability primarily the following technologies will be combined: LTE-V corresponds to the 4G mobile communication technology, LTE PC5 corresponds to the 5G mobile communication technology and WLAN p, corresponds to the IEEE 802.11p communication technology.

In terms of the LTE mobile communication system, the Evolved UMTS Terrestrial Radio Access Network E-UTRAN of LTE consists of a plurality of eNodeBs, providing the E-UTRA user plane (PDCP/RLC/MAC/PHY) and control plane (RRC) protocol terminations towards the UE. The eNodeBs are interconnected with each other by the so-called X2 interface. The eNodeBs are also connected by the so-called S1 interface to the EPC (Evolved Packet Core) 200, more specifically to the MME (Mobility Management Entity) by the S1-MME and to the Serving Gateway (S-GW) by the S1-U interface.

From this general architecture FIG. 1 shows that eNodeB 210 is connected to the EPC 200 via the S1 interface and that EPC 200 is connected to the Internet 300. The backend server 320 to which the transportation vehicles 10 send messages to and receive messages from is also connected to the Internet 300. In the field of cooperative and autonomous driving the backend server 320 typically is located in a traffic control center. The S1 interface may be reduced to practice with wireless communication technology such as with the help of microwave radio communication by directional antennas or wired communication technology based on fiber cables. Finally, an infrastructure network component is also shown. This may be exemplified by a road-side unit RSU 310. For the ease of implementation, it is considered that all components have assigned an Internet address, typically as an IPv6 address, such that the packets transporting messages between the components can be routed correspondingly.

The various interfaces of the LTE network architecture are standardized. It is referred to the various LTE specifications, which are publicly available for the sake of sufficiently disclosing further implementation details.

Figure 2:
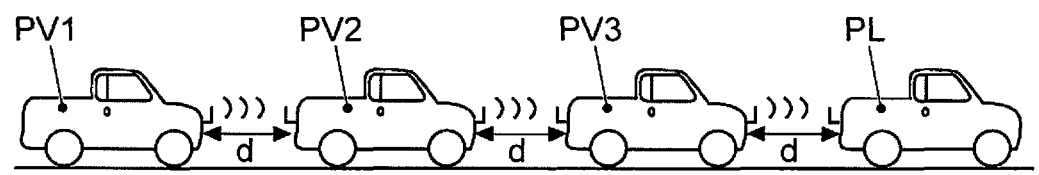
FIG. 2 shows a high density platooning scenario in which a plurality of transportation vehicles cooperatively drive in a convoy.

As already mentioned in the consistory clause, one prominent example of a cooperative driving maneuver is called "platooning". FIG. 2 shows what it is. Platooning refers to the intelligent convoy driving as an application, which is also known as "high density platooning". The distances d between the transportation vehicles of the convoy, e.g., trucks are adapted to the traffic situation and controlled. The aim is to reduce the distance d between the convoy vehicles as much as possible to reduce energy consumption. For this purpose, messages must be constantly exchanged between the convoy vehicles. There is one transportation vehicle which is coordinating the cooperative driving maneuver. It is the transportation vehicle at the front of the platoon, which is called the platoon leader. In FIG. 2 the platoon leader is marked with reference sign PL. The other transportation vehicles in the platoon are marked with reference signs PV1, PV2, PV3.

Typically, in high density platooning trucks of appropriate length, band together to cover a distance together to save energy and protect the environment. All transportation vehicles are equipped with a GNSS receiver corresponding to Global Navigation Satellite System. Examples of a GNSS receiver are a GPS-receiver corresponding to Global Positioning System, Galilei-, GLONASS- and Beidou-receiver.

All transportation vehicles of the platoon are equipped with the on-board connectivity unit including direct transportation vehicle communication capability. Furthermore, it is shown that the transportation vehicles are also equipped with UWB transceivers corresponding to ultra-wide-band transceivers. The transportation vehicles are each equipped with 2 UWB transceivers, one at the front of the transportation vehicle and a second at the rear of the transportation vehicle. The UWB transceivers allow the measurement if the inter transportation vehicle distance with great accuracy. The transportation vehicles are also equipped with a platoon coordination unit. However, this feature is only activated on the platoon leader transportation vehicle PL.

The transportation vehicles are also equipped with methods or mechanisms for surroundings observation. The sensor system, which is used to capture the environmental objects is based on different measuring methods depending on the application. Widespread technologies are among others RADAR corresponding to Radio Detection and Ranging, LIDAR corresponding to Light detection and ranging, cameras 2D and 3D and ultrasonic sensors.

Figure 3:
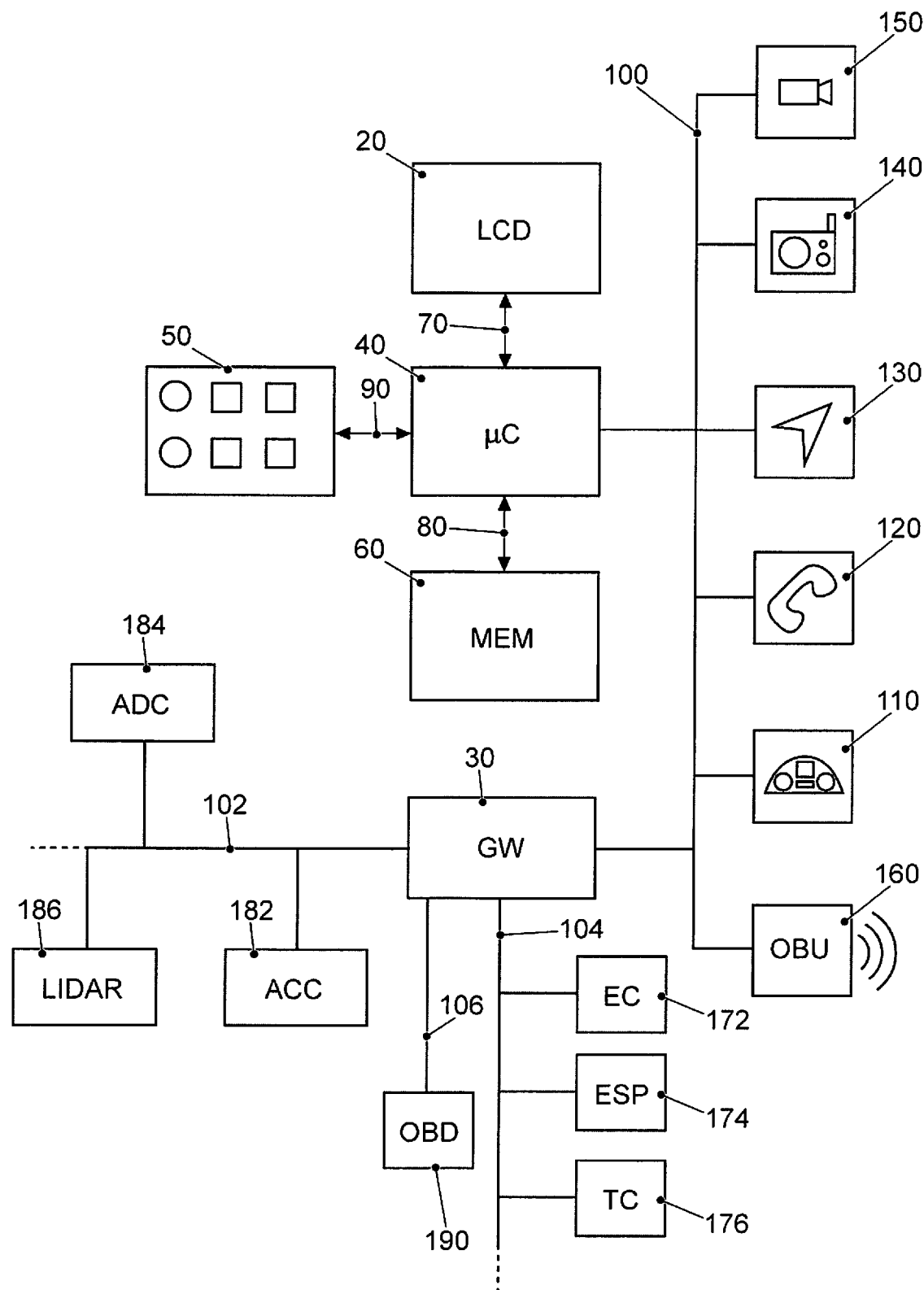
FIG. 3 shows a block diagram of the electronics system of a transportation vehicle.

FIG. 3 shows schematically a block diagram of a board electronics system of the transportation vehicle 10. Part of the board electronics system is an infotainment system which comprises: the touch-sensitive display unit 20, a computing device 40, an input unit 50, and a memory 60. The display unit 20 includes both a display area for displaying variable graphical information and an operator interface (touch-sensitive layer) arranged above the display area) for inputting commands by a user.

The memory device 60 is connected to the computing device 40 via a further data line 80. In the memory 60, a pictogram directory and/or symbol directory is deposited with the pictograms and/or symbols for possible overlays of additional information.

The other parts of the infotainment system such as camera 150, radio 140, navigation device 130, telephone 120 and instrument cluster 110 are connected via the data bus 100 with the computing device 40. As data bus 100 is the high-speed option of the CAN bus according to ISO standard 11898-2 into consideration. Alternatively, for example, the use of an Ethernet-based bus system such as IEEE 802.03cg is another example. Bus systems in which the data transmission via optical fibers happens are also usable. Examples are the MOST Bus (Media Oriented System Transport) or the D2B Bus (Domestic Digital Bus). For inbound and outbound wireless communication, the transportation vehicle 10 is equipped with a communication module 160. This communication module 160 is often referred to as an on-board connectivity module OCU as mentioned above. It can be used for mobile communication, e.g., mobile communication according to the LTE standard, according to Long Term Evolution. It is also equipped with multi-RAT technology as mentioned above.

Reference numeral 172 denotes an engine control unit. The reference numeral 174 corresponds to an ESC control unit corresponding to electronic stability control and the reference numeral 176 denotes a transmission control unit. The networking of such control units, all of which are allocated to the category of the drive train, typically occurs with the CAN bus system (controller area network) 104. Since various sensors are installed in the transportation vehicle and these are no longer only connected to individual control units, such sensor data are also distributed via the bus system 104 to the individual control devices.

However, the modern transportation vehicle can also have further components such as further surroundings scanning sensors like a LIDAR (Light Detection and Ranging) sensor 186 or RADAR (Radio Detection and Ranging) sensor and more video cameras, e.g., as a front camera, rear camera or side camera. Such sensors are used more and more in transportation vehicles for surroundings observation. Further control devices, such as an automatic driving control unit ADC 184 and an adaptive cruise control unit ACC 182, etc., may be provided in the transportation vehicle. There may be other systems in the transportation vehicle, too such as the UWB transceivers for inter transportation vehicle distance measurement. The UWB transceivers may typically be used for a short distance observation, e.g., 3 to 10 m. The RADAR and LIDAR sensors could be used for scanning a range up to 250 m or 150 m and the cameras cover a range from 30 to 120 m. The components 182 to 186 are connected to another communication bus 102. The Ethernet-Bus is a choice for this communication bus 102 due to its higher bandwidth for data transport. One Ethernet-Bus adapted to the special needs of car communication is standardized in the IEEE 802.1Q specification. Moreover, a lot of information for surroundings observation may be received via V2V communication from other road participants. For those road participants not being in line of sight LOS to the observing transportation vehicle it is very beneficial to receive the information about their position and motion via V2V communication.

Reference number 190 denotes an on-board diagnosis interface.

For the purpose of transmitting the transportation vehicle-relevant sensor data via the communication interface 160 to another transportation vehicle or to a central computer 320, the gateway 30 is provided. This is connected to the different bus systems 100, 102, 104 and 106. The gateway 30 is adapted to convert the data it receives via the one bus the transmission format of the other bus so that it can be distributed in the packets specified there. For the forwarding of this data to the outside, i.e., to another transportation vehicle or to central computer 320, the on-board unit 160 is equipped with the communication interface to receive these data packets and, in turn, to convert them into the transmission format of the correspondingly used mobile radio standard. The gateway 30 takes all the necessary format conversions if data are to be exchanged between the different bus systems if required.

Figure 4:
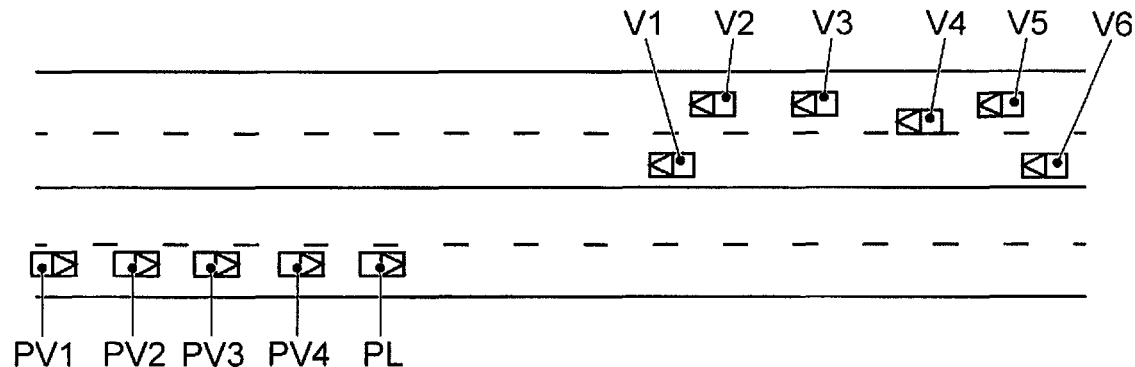
FIG. 4 shows a first stage scenario of a platoon moving on a motorway.

FIG. 4 shows a typical traffic scenario where a platoon is driving on a motorway. The platoon consist in this example of five transportation vehicles PV1 to PV4 and PL. The platoon is moving from left to right. A plurality of other transportation vehicles V1 to V6 is coming along on the opposite side of the motorway moving from right to left.

Under the considered scenario of cooperative or autonomous driving the transportation vehicles broadcast so-called Cooperative Awareness Messages CAM and Collective Perception Messages CPM periodically such that they are aware which other transportation vehicles are in the vicinity. Cooperative awareness messages (CAM) contain important status information from a sending transportation vehicle, such as position, speed, heading, accelerating data etc. Since CAM messages are standardized, more detailed information is provided in the ETSI standard ETSI EN 302 637—

2 V1.3.2 (2014-11). CAM information provides information about the traffic flow. They are compressed and transmitted to the traffic control center. CAM messages contain the transportation vehicle data, the date and time, position and speed. By aggregating these dates, average values for the speed, latency, or number of stops are calculated. In addition, the traffic lights can be controlled traffic-dependent.

In the CPM messages V2X transportation vehicles equipped with local perception sensors broadcast their locally perceived objects in the surroundings derived from the analysis of the sensor data. Since the environment sensors deliver picture setting information the typical analysis algorithms correspond to image processing algorithms such as object recognition algorithms.

A problem in surroundings observation and transmission condition estimation in transportation vehicles is the influence of the relative movement between transmitting station and receiving station on the transmission conditions. The Doppler effect causes a frequency shift at the receiving transportation vehicle and is dependent on the frequency range of the transmission. There are solutions available to make the communication systems robust against the Doppler spread. One sophisticated solution for the LTE mobile communication system is described in DE 10 2016 211 894 A1. Here, the relative velocity between transmitting station and receiving station will be estimated and corresponding to the estimated velocity the number of DMRS symbols (demodulation reference symbol) will be adjusted for transmission of V2V messages. Those DMRS symbols serve as pilot reference symbols. With more DMRS symbols in the transmission frame channel estimation on the receiving side is more accurate such that the receiver can cope better with the Doppler spread.

Figure 5:
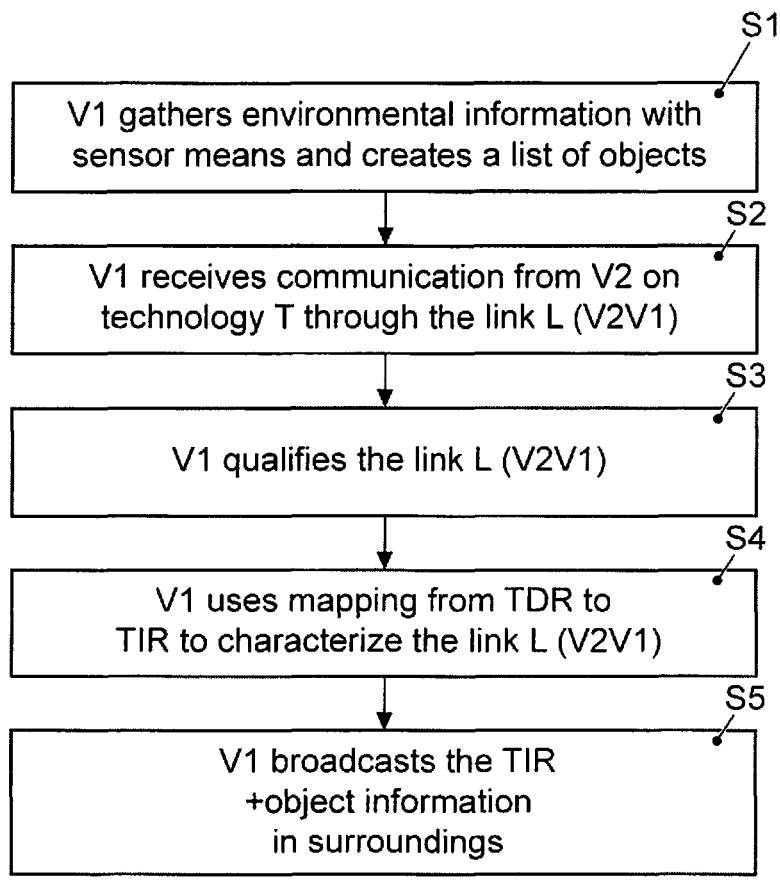
FIG. 5 shows a flow chart for the process of gathering information about communication link qualities of service from surrounding transportation vehicles.

FIG. 5 shows the concept for setting up a link quality map which may be used in a cooperative or autonomous driving application. Considered is the high density platooning application as mentioned before. It is again referred to FIG. 4 which shows the driving scenario. The transportation vehicle which performs these operations can be any transportation vehicle from the transportation vehicles V1 to V6. As an example, it is referred to transportation vehicle V1 which collects the information about the environment.

In operation at S1, transportation vehicle V1 gathers environmental information with its sensor methods or mechanisms and creates a list of objects. It is referred to what has been the before in regard to environment perception with surroundings scanning sensors. The objects are characterized by the information about their position, speed, moving direction and their shape (information about the dimension or size of the object).

In operation at S2 transportation vehicle V1 receives a communication message from transportation vehicle V2 through the communication link L(V2, V1). Since we have multi-RAT technology involved, this communication link is one of the communication technologies the multi-RAT technology offers (LTE-V, 5G PC5, WLAN p, etc.). Such message may be any of the already mentioned messages CAM, CPM and others.

In operation at S3 transportation vehicle V1 qualifies the link L(V2, V1). Here, what concerns the qualification is a so-called technology dependent representation TDR. Typical information for characterizing the link concerns coefficients H, Doppler compensation information D, Latency information L, Data Rate information DR, Throughput information Th, Packet Error Rate information PER, etc.

In operation at S4 transportation vehicle V1 performs a mapping from the TDR information to a technology independent representation TIR to characterize the link L(V2, V1). The details of this mapping operation will be disclosed in a parallel application of the applicant. In other words the technology independent representation corresponds to an abstracted channel representation.

In operation at S5 transportation vehicle V1 broadcasts the TIR information about the link L(V2, V1) in a cooperative communication message. The use and format of the cooperative communication messages CCM is subject of a parallel application of the applicant. Such information will be collected by a transportation vehicle for setting up a link quality map.

Figure 6:
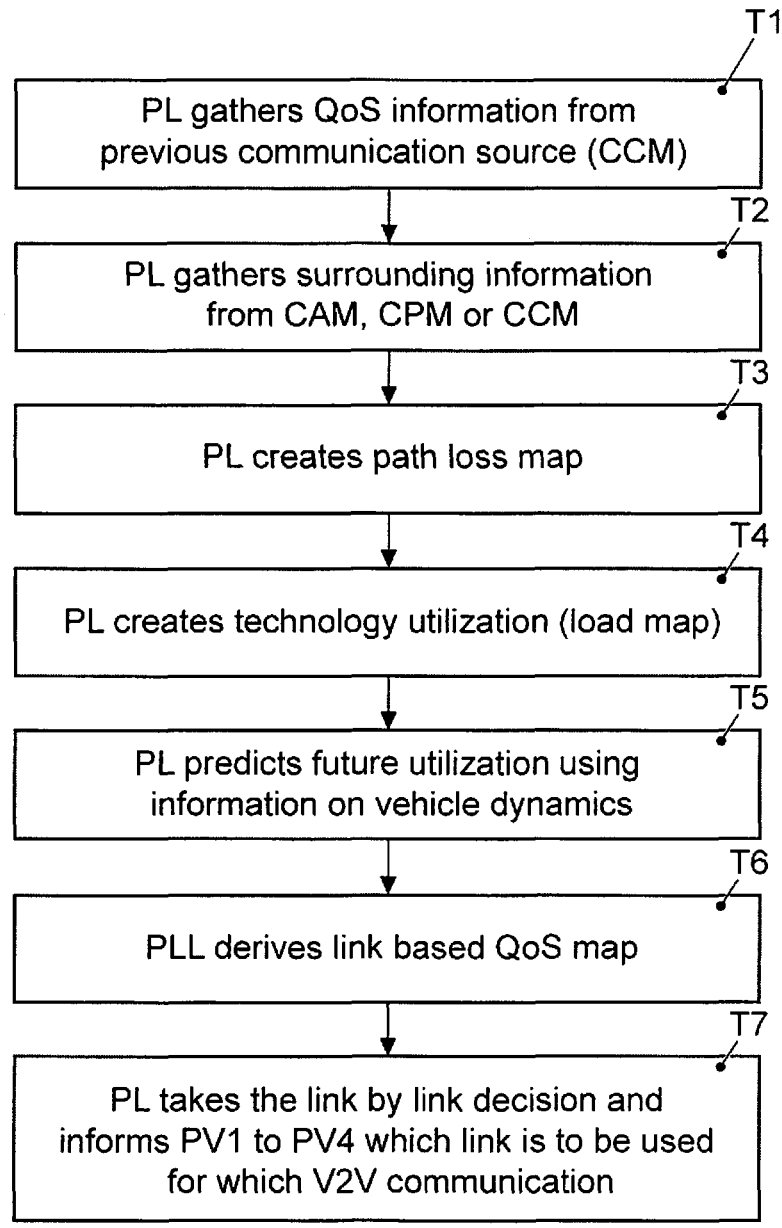
FIG. 6 shows a flow chart for the process of creating a link-based QoS map and for taking a link by link decision for future communications over such links.

FIG. 6 now shows the architectural concept for a solution how the quality of service for a plurality of communication links could be better predicted to adapt an application which makes use of such communication links. This also involves the setting up of a link quality map as will be further explained below. Since the disclosed embodiment concerns the use case of high density platooning, it is considered that the platoon leader PL sets up the link quality map. In other disclosed embodiments it could be any recipient of the CCM messages.

Figure 7:
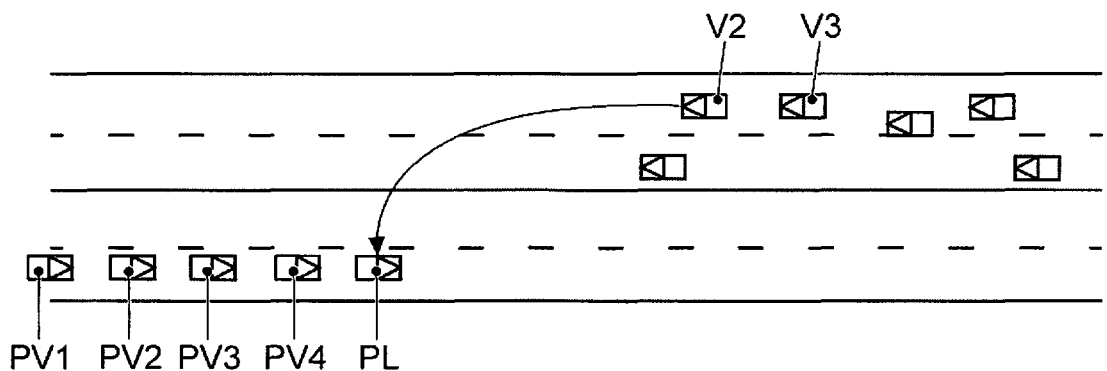
FIG. 7 shows a second stage scenario of the platoon moving on a motorway.

In operation at T1 the platoon leader PL gathers the link quality information from previous communication partners. This operation is illustrated in FIG. 7. It shows that the platoon leader PL receives a CCM message from transportation vehicle V2. It may receive CCM messages also from other communication partners.

In operation at T2 platoon leader PL gathers information about the surroundings from previous communication partners. Such information is received in the messages CAM and CPM or CCM as mentioned above.

In operation at T3 the platoon leader PL performs an operation of creating path loss maps for the communication links he has available according to the multi-RAT technology. A path loss normally includes the propagation losses caused by the natural expansion of the radio wave front in free space (which usually takes the shape of an ever-increasing sphere), absorption losses (sometimes called penetration losses), when the signal passes through media not transparent to electromagnetic waves, diffraction losses when part of the radio wave front is obstructed by an opaque obstacle, and losses caused by other phenomena.

In operation at T4 the platoon leader PL performs an operation of creating load maps for the communication links he has available according to the multi-RAT technology. These maps could be derived from the information about the environment which includes the information about which of the surrounding transportation vehicles currently make use of which communication link. Such information can be derived from the messages CAM and CPM or CCM as mentioned above. In an alternative disclosed embodiment the load map may be received from the network, e.g., from the traffic control center 320. It may receive this information via a communication with the road side unit 310.

In operation at T5 the platoon leader PL performs an operation of predicting the future load maps for the communication links available due to the multi-RAT technology. The prediction is based on an operation of analyzing the transportation vehicle dynamics of the transportation vehicles in the environment.

In operation at T6 the platoon leader PL creates the link based quality of service map for the available communication links. There is a distinct difference between a link-based QoS map and the typical radio maps which are used in cellular-based communication systems. Such radio maps do not cover the device to device, and more particular, the transportation vehicle to transportation vehicle, communications. A radio map can be seen as a centralized system quality of service representation whilst a link-based QoS map depicts a decentralized system. Moreover, even in cellular based system, a classical radio map is not sufficient to predict the so-called end to end latency E2E as the latter encompasses a very large number of factors such as number of users, environment conditions (weather conditions such as rain, temperature, etc.) and surrounding conditions whether there are reflectors and scatterers located in the vicinity which are responsible for interferences like effects due to multi-path reception. The dynamics of the reflectors and scatterers are not accounted for in radio maps).

The operations of the creation of the link quality maps are the following at the platoon leader:
  Link Quality data gathering through ongoing communications on all technologies, derivation of E2E latency from CAM/CPM timestamps, for instance;
  Idem with pose information (position, movement direction, etc.) and dynamics (velocity, acceleration, yaw rate etc.) of communications technologies users (transportation vehicles);
  Creation of path-loss maps using path-loss prediction based on scene understanding (computer vision, scene map transmitted by infrastructure etc.), shadowing and scattering effect prediction.
  Creation of technology utilisation map using information from infrastructure, number of users per grid unit, etc. This also takes into account the movement of these users, thanks to pose/dynamics information sharing.
  Using current knowledge of occurring QoS, E2E latency, for instance, map the path-loss and technology utilisation to derive the link-based QoS map.

For the creation of those maps interpolation/extrapolation techniques such as linear interpolation, cubic spline interpolation, and kriging as kernel based methods can be used. For managed technologies LTE, LTE-V, 5G PC5, the prediction can directly come from the network (backend server 310).

Figure 8:
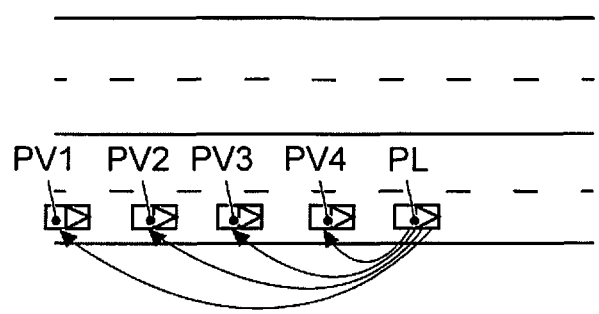
FIG. 8 shows a third stage scenario of the platoon moving on a motorway.

In operation at T7 the platoon leader PL with the help of the link-based QoS map takes the link-by-link decision and informs the transportation vehicles PV1 to PV4 in the platoon about which link is to be used for which V2V communication. Under the scenario of platooning, with the link-by-link decision in at least one disclosed embodiment it is determined which communication partners in the platoon perform V2V communication over which RAT technology, see also FIG. 10 where this is illustrated. This operation is illustrated in FIG. 8. A default link is to be used for this communication, e.g., the LTE-V side link communication channel.

Figure 9:
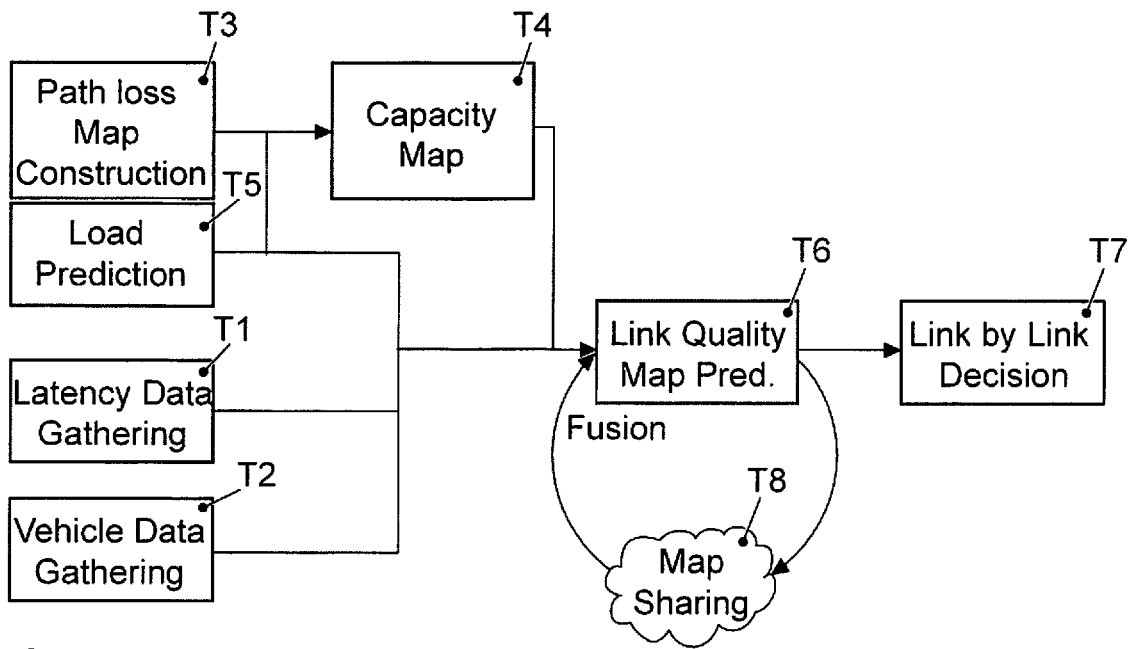
FIG. 9 shows an overview about a link quality map generation system in a multi-agent communication system.

FIG. 9 shows the process of setting up a link-based QoS map and using it for taking the link-by-link decision in another form of a process flow diagram. Equal reference signs denote the same process operations as in FIG. 7. There are some additional operations shown in this disclosed embodiment.

In a parallel patent application EP 18192353.3 of the applicant a technology independent channel representation is proposed. An example of parameters for this channel representation could be the values of the channel coefficients $H=(a\_1, \ldots, a\_n)$ as well a quantitative characterization of the Doppler shift (a vector D) affecting the channel. This measurement is also associated with the spatial locations, dynamics shape and pose (com_i=x, y, z, v, θ, length, width, height) along with communication parameters such as modulation, coding scheme, antenna placement, etc. of the two communication partners.

For each specific RAT technology, this measurement is associated with the quality of service key performance indicators KPIs such as, e.g., latency t, data rate DR, throughput Th and packet error rate PER.

In a further parallel application EP 18184352.5 it is disclosed a cooperative communication message format which is evaluated in a receiving node to achieve an improved channel prediction as using historical measurement results. How to do the improved channel prediction is disclosed in a still further patent application EP 18192367.3. In the cooperative communication message, the channel representation as defined in the first mentioned parallel application EP 18192353.3 is included along with a surrounding object representation (obj_1 . . . n=x, y, z, v, θ, length, width, height) captured from the own sensors/or the information received in the CPM messages from other transportation vehicles in the surroundings as a list.

After performing a transmission, at least one communication partner if not two (or more) have collected channel representations as described in EP 18192353.3 as well as RAT technology related QoS information (t, DR, Th, PER)). From their sensors, they also collected environmental information (surrounding objects obj_1 . . . n) and ego information (types of the communication links to be used in the multi-RAT technology). From this data, the entities create a link object L, encompassing the surrounding objects (or reference to them in a cooperative perception service, if available), link quality, communication partners settings, shape, localization information. This link object L is packed in a cooperative communication message as defined in the patent application EP 18184352.5 and regularly broadcast to achieve the dissemination of the information in space and time.

This message stores previous link object related to a restricted geographical area as well as to the coherence time of this data, a few minutes.

Receiving this information, an agent AG performs the following operations:
  Learning the quality of service as a function of the channel representation;
  Learning the channel representation as a function of the surrounding environment.
With this two learned functions the agent AG is able to:
  Forecast the quality of service as a function of the predicted future environment, and accordingly adapt the cooperative function;
  investigate the correlation between the predicted future perceived environment and the previous environment perception measurements. The correlation degree, e.g., correlation coefficient, is applied to map the predicted future environment into a channel representation and thus into QoS KPIs. A future channel representation is selected, for which the likelihood between predicted future environment and previous perception measurements is maximized;
  better understand the instantaneous channel using its perception of the environment as well as the information from previous measurements as described in EP 18192367.3 and accordingly take the multi-Rat/diversity decision to optimise the use of the multi-RAT technology.

Figure 10:
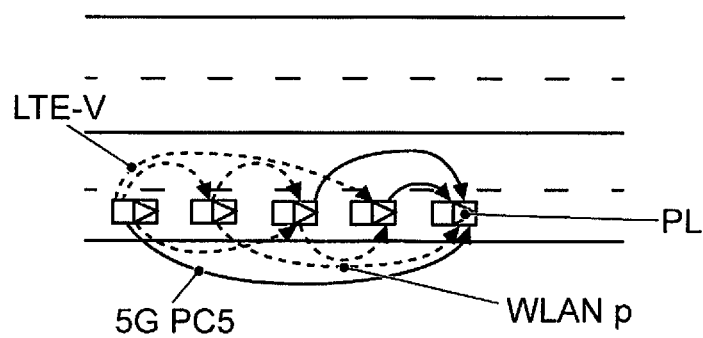
FIG. 10 shows a fourth stage scenario of the platoon moving on a motorway.

FIG. 10 shows the resulting choice of the platoon leader PL which RAT technology is to be used for which intra platooning communication.

The described operations would provide a rather short term prediction horizon—considering the high dynamics of some applications such as high density platooning this is sufficient for multi-Rat decision-making but not for an application adaptation. This prediction horizon could be extended by using more involved agents AG. This would be done by a process of link-based QoS map sharing using custom messages. Knowledge from other agents is then fused to obtain a spatio-temporally extended link quality map. This is also illustrated in FIG. 9, see operations at T6 & T8.

Using this extended map, the vehicular application can make a decision to adapt its functioning to the predicted variation of the link-based QoS in a middle term, and get an enhanced QoS in the short term. Considering again the high density platooning a possible implementation is as follows:
  Platoon leader PL, at its diversity layer, obtains the spatio-temporally extended link-based quality map as previously mentioned;
  To reduce processing time, in its data fusion operation, the platoon leader PL only considers an area of interest from the link-based quality map that would be dependent on its known trajectory and the communication range of the analysed RAT technology;
  Platoon leader PL creates an optimized plan for the intra-platoon communications on a link basis for each platoon member PV1 to PV4;
  Platoon leader PL uses default communication channels to inform the diversity layers of the platoon members PV1 to PV4 about the new plan.

The data fusion operation would be performed in a way that corresponding entries in the link-based QoS map from the communication management partner and the QoS maps of the at least one other communication partner pair are fused. Entries in a link-based QoS map may comprise all sort of QoS parameters like one or more of the parameters path loss, E2E latency, bandwidth, jitter, shadowing effect prediction, white spots and static scatterers mapping, Doppler shift predictions from dynamic scatterers, etc.

An example of such an application adaptation for the high-density platooning application would be to increase the distance d between the platoon members Pl, PV1 to PV4 in the case that the predicted link based QoS drops drastically and decrease the distance d in case the predicted link based QoS is good enough.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to and executed by a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed. Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments, which are also considered to belong to the disclosure.

REFERENCE SIGN LIST

10 Transportation vehicle
20 Touch Screen
30 Gateway
40 Computing Device
50 Operation Element Unit
60 Memory Unit
70 Data Line to Display Unit
80 Data Line to Memory Unit
90 Data Line to Operation Element Unit
100 Data Bus
110 Multifunction Display
120 Telephone
130 Navigation System
140 Radio
150 Camera
160 On-Board Connectivity Unit
200 Evolved Packet Core
210 Base Station
300 Internet
310 Road Side Unit
320 Backend Server
PL Platoon Leader
PV1-PV4 Platoon Members
V1-V6 further Transportation Vehicles
LTE-V first Communication Link
5G PC5 second Communication Link
WLAN p third Communication Link
S1-S5 various method operations
T1-T8 various further method operations

The invention claimed is:

1. An apparatus for predicting a quality of service (QoS) for communication between at least two moving communication partners, the apparatus comprising:
a processing device configured to perform communication management partner operations,
wherein the at least two moving communication partners apply multi-radio access technology (RAT) communication technology, wherein the at least two moving communication partners are equipped with a plurality of different radio access technologies, each of the plurality of different radio access technologies being arranged for a corresponding RAT communication link of a plurality of RAT communication links,
wherein prediction of QoS for communication between the at least two moving communication partners is performed for at least two of the plurality of RAT communication links, wherein the prediction is based on at least one RAT communication link-based QoS map that is updated by a link-based QoS map generation process, the link-based QoS map generation process including link quality data gathering for ongoing communications on the plurality of RAT communication links from other communication partners, data gathering of dynamics of movement of the other communication partners, creating a path-loss map based on a scene understanding derived from an environment observation of at least one of the other communication partners, creating a technology utilization map showing current load of the respective RAT communication link at least in an area of interest, and generating a link-based QoS map as a decentralized QoS representation, wherein the link-based QoS map includes information about end-to-end latency for a data transmission over the respective RAT communication link.

2. A transportation vehicle comprising the apparatus of claim 1.

3. A backend server comprising the apparatus of claim 1.

4. The apparatus of claim 1, wherein the link-based QoS map generation process is performed in at least one communication management partner of the at least two moving communication partners.

5. The apparatus of claim 1, wherein a spatio-temporally extended link-based QoS map is created by combining the knowledge of the communication management partner with the knowledge of the link-based QoS maps of at least one other communication partner pair.

6. The apparatus of claim 5, wherein combining the knowledge about the link-based QoS map of the communication management partner with the knowledge of the link-based QoS maps of at least one other communication partner pair is performed by transferring the link-based QoS map of the at least one other communication partner pair to the communication management partner and performing data fusion between at least one entry in the link-based QoS map of the communication management partner with the corresponding entries in the link-based QoS maps of the at least one other communication partner pair.

7. The apparatus of claim 6, wherein for the operation of data fusion an operation of selecting an area of interest is performed in the communication management partner and wherein the data fusion operation is performed for the area of interest.

8. The apparatus of claim 1, wherein the link-based QoS map includes an information about the packet error rate PER for a data transmission over the RAT communication link.

9. The apparatus of claim 1, wherein an operation of deciding for the different RAT communication links of the multi-RAT technology which communication partners from the moving communication partners shall use which RAT communication link is performed in the communication management partner, wherein the communication management partner performs an operation of informing the moving communication partners about the link-by-link decision from the operation of deciding.

10. The apparatus of claim 5, wherein for the operation of combining the knowledge about the link-based QoS map of the communication management partner with the knowledge of the link-based QoS maps of at least one other communication partner pair, an operation of mapping the predicted future perceived environment with the environments from the previous environment perception measurements of the at least one other communication partner pair is performed and a future channel representation is selected for which the mapping between the predicted future environment and the environment from the previous environment perception measurements is best.

11. The apparatus of claim 10, wherein the operation of mapping includes an operation of determining the correlation between the predicted future perceived environment and the environment from the previous environment perception measurements of the at least one other communication partner pair and applying the correlation degree to select a future channel representation, for which the likelihood between the predicted future environment and the environment from the previous environment perception measurements is maximized.

12. A non-transitory computer readable medium including a computer program included in program code, which when run in a processing device performs communication management partner operations,
wherein the at least two moving communication partners apply multi-radio access technology (RAT) communication technology, wherein the at least two communication partners are equipped with a plurality of different radio access technologies, each of the plurality of different radio access technologies being arranged for a corresponding RAT communication link of a plurality of RAT communication links,
wherein prediction of (QoS) for communication between the at least two of the moving communication partners is performed for at least two of the plurality of RAT communication links, wherein the prediction is based on at least one RAT communication link-based QoS map that is updated by a link-based QoS map generation process, the link-based QoS map generation process including link quality data gathering for ongoing communications on the plurality of RAT communication links from other communication partners, data gathering of dynamics of movement of the other communication partners, creating a path-loss map based on a scene understanding derived from an environment observation of at least one of the other communication partners, creating a technology utilization map showing current load of the respective RAT communication link at least in an area of interest, and generating a link-based QoS map as a decentralized QoS representation, wherein the link-based QoS map includes information about end-to-end latency for a data transmission over the respective RAT communication link.

13. The non-transitory computer readable medium of claim 12, wherein the link-based QoS map generation process is performed in at least one communication management partner of the at least two moving communication partners.

14. The non-transitory computer readable medium of claim 12, wherein a spatio-temporally extended link-based QoS map is created by combining the knowledge of the communication management partner with the knowledge of the link-based QoS maps of at least one other communication partner pair.

15. The non-transitory computer readable medium of claim 14, wherein the link-based QoS map generation process is performed in at least one communication management partner of the at least two moving communication partners.

16. The non-transitory computer readable medium of claim 14, wherein a spatio-temporally extended link-based QoS map is created by combining the knowledge of the communication management partner with the knowledge of the link-based QoS maps of at least one other communication partner pair.

17. The non-transitory computer readable medium of claim 16, wherein combining the knowledge about the link-based QoS map of the communication management partner with the knowledge of the link-based QoS maps of at least one other communication partner pair is performed by transferring the link-based QoS map of the at least one other communication partner pair to the communication management partner and performing data fusion between at least one entry in the link-based QoS map of the communication management partner with the corresponding entries in the link-based QoS maps of the at least one other communication partner pair.

18. The non-transitory computer readable medium of claim 17, wherein for the operation of data fusion an operation of selecting an area of interest is performed in the communication management partner and wherein the data fusion operation is performed for the area of interest.

19. The non-transitory computer readable medium of claim 14, wherein the link-based QoS map includes an information about the packet error rate PER for a data transmission over the RAT communication link.

20. The non-transitory computer readable medium of claim 14, wherein an operation of deciding for the different RAT communication links of the multi-RAT technology which communication partners from the moving communication partners shall use which RAT communication link is performed in the communication management partner, wherein the communication management partner performs an operation of informing the moving communication partners about the link-by-link decision from the operation of deciding.

21. The non-transitory computer readable medium of claim 16, wherein for the operation of combining the knowledge about the link-based QoS map of the communication management partner with the knowledge of the link-based QoS maps of at least one other communication partner pair, an operation of mapping the predicted future perceived environment with the environments from the previous environment perception measurements of the at least one other communication partner pair is performed and a future channel representation is selected for which the mapping between the predicted future environment and the environment from the previous environment perception measurements is best.

22. The non-transitory computer readable medium of claim 21, wherein the operation of mapping includes an operation of determining the correlation between the predicted future perceived environment and the environment from the previous environment perception measurements of the at least one other communication partner pair and applying the correlation degree to select a future channel representation, for which the likelihood between the predicted future environment and the environment from the previous environment perception measurements is maximized.

23. A method for predicting a quality of service (QoS) for communication between at least two moving communication partners, the method comprising:
the at least two moving communication partners applying multi-radio access technology (RAT) communication technology wherein the at least two moving communication partners are equipped with a plurality of different radio access technologies, each of the plurality of different radio access technologies being arranged for a corresponding RAT communication link of a plurality of RAT communication links; and performing prediction of QoS for communication between the at least two of the moving communication partners for at least two of the plurality of RAT communication links, wherein the prediction is based on at least one RAT communication link-based QoS map that is updated by a link-based QoS map generation process, the link-based QoS map generation process including link quality data gathering for ongoing communications on the plurality of RAT communication links from other communication partners, data gathering of dynamics of movement of the other communication partners, creating a path-loss map based on a scene understanding derived from an environment observation of at least one of the other communication partners, creating a technology utilization map showing current load of the respective RAT communication link at least in an area of interest, and generating a link-based QoS map as a decentralized QoS representation, wherein the link-based QoS map includes information about end-to-end latency for a data transmission over the respective RAT communication link.

24. The method of claim 23, wherein the link-based QoS map generation process is performed in at least one communication management partner of the at least two moving communication partners.

25. The method of claim 23, wherein a spatio-temporally extended link-based QoS map is created by combining the knowledge of the communication management partner with the knowledge of the link-based QoS maps of at least one other communication partner pair.

26. The method of claim 25, wherein combining the knowledge about the link-based QoS map of the communication management partner with the knowledge of the link-based QoS maps of at least one other communication partner pair is performed by transferring the link-based QoS map of the at least one other communication partner pair to the communication management partner and performing data fusion between at least one entry in the link-based QoS map of the communication management partner with the corresponding entries in the link-based QoS maps of the at least one other communication partner pair.

27. The method of claim 26, wherein for the operation of data fusion an operation of selecting an area of interest is performed in the communication management partner and wherein the data fusion operation is performed for the area of interest.

28. The method of claim 23, wherein the link-based QoS map includes an information about the packet error rate PER for a data transmission over the RAT communication link.

29. The method of claim 23, wherein an operation of deciding for the different RAT communication links of the multi-RAT technology which communication partners from the moving communication partners shall use which RAT communication link is performed in the communication management partner, wherein the communication management partner performs an operation of informing the moving communication partners about the link-by-link decision from the operation of deciding.

30. The method of claim 25, wherein for the operation of combining the knowledge about the link-based QoS map of the communication management partner with the knowledge of the link-based QoS maps of at least one other communication partner pair, an operation of mapping the predicted future perceived environment with the environments from the previous environment perception measurements of the at least one other communication partner pair is performed and a future channel representation is selected for which the mapping between the predicted future environment and the environment from the previous environment perception measurements is best.

31. The method of claim 30, wherein the operation of mapping includes an operation of determining the correlation between the predicted future perceived environment and the environment from the previous environment perception measurements of the at least one other communication partner pair and applying the correlation degree to select a future channel representation, for which the likelihood between the predicted future environment and the environment from the previous environment perception measurements is maximized.

* * * * *